(12) United States Patent
Le Devehat et al.

(10) Patent No.: US 7,992,067 B1
(45) Date of Patent: Aug. 2, 2011

(54) METHOD OF IMPROVING SUCCESSFUL RECOGNITION OF GENUINE ACOUSTIC AUTHENTICATION DEVICES

(75) Inventors: Yannick Le Devehat, Quebec (CA); David Perron, Quebec (CA); Olivier Fraysse, Quebec (CA); Pierre Dumouchel, Ile des Soeurs (CA); Rene Landry, Jr., Longueuil (CA); Francois Rivest, Ville de Deux Montagnes (CA)

(73) Assignee: Identita Technologies International SRL, Christ Church (BB)

( * ) Notice: Subject to any disclaimer, the term of this patent is extended or adjusted under 35 U.S.C. 154(b) by 131 days.

(21) Appl. No.: 12/365,550

(22) Filed: Feb. 4, 2009

Related U.S. Application Data

(63) Continuation of application No. 10/291,195, filed on Nov. 8, 2002, now abandoned.

(60) Provisional application No. 60/348,212, filed on Nov. 9, 2001, provisional application No. 60/337,514, filed on Dec. 6, 2001, provisional application No. 60/344,174, filed on Dec. 27, 2001, provisional application No. 60/371,821, filed on Apr. 11, 2002.

(51) Int. Cl.
*H03M 13/00* (2006.01)

(52) U.S. Cl. ......... 714/752; 714/786; 375/342; 375/328

(58) Field of Classification Search ................. 714/777, 714/782, 752, 786; 375/342, 328
See application file for complete search history.

(56) References Cited

U.S. PATENT DOCUMENTS

| 4,126,768 | A | 11/1978 | Grenzow |
| 4,481,574 | A | 11/1984 | DeFino et al. |
| 4,677,657 | A | 6/1987 | Nagata et al. |
| 4,817,135 | A | 3/1989 | Winebaum |
| 4,980,910 | A | 12/1990 | Oba et al. |
| 4,995,077 | A | 2/1991 | Malinowski |

(Continued)

FOREIGN PATENT DOCUMENTS

| WO | WO 98/13971 | 4/1998 |
| WO | WO 98/13972 | 4/1998 |
| WO | WO 98/13984 | 4/1998 |
| WO | WO 98/22880 | 5/1998 |
| WO | WO 99/23804 | 5/1999 |
| WO | WO 00/77751 | 12/2000 |

OTHER PUBLICATIONS

Parajes et al., "Dynamic Frequency and Resource Allocation with Adaptive Error Control Based on RTP for Multimedia QoS Guarentees in Wireless Networks," IEEE, 1999, pp. 333-337.

*Primary Examiner* — Esaw T Abraham
(74) *Attorney, Agent, or Firm* — Cowan Liebowitz & Latman, P.C.

(57) ABSTRACT

Methods and apparatus for coding a digital data string to represent a sequence of acoustic frequencies to be transmitted as an acoustic signal by a genuine acoustic authentication device; related to providing for improving the rate of successfully detecting a valid data string contained in the acoustic signal transmitted by the device. Each of a plurality of groups of bits of the data string are coded to represent a respective frequency value set of one or more acoustic frequencies to be transmitted acoustically to represent the respective group of bits. The number of acoustic frequencies in a frequency value set is less than the number of bits in the respective group of bits that the frequency value set represents. For each of the plurality of groups of bits of the data string, the respective frequency value set is selected according to a predetermined frequency assignation pattern that provides for probabilistic transition coding used for error correction of the acoustic signal.

35 Claims, 7 Drawing Sheets

U.S. PATENT DOCUMENTS

| | | | |
|---|---|---|---|
| 5,003,601 | A | 3/1991 | Watari et al. |
| 5,136,632 | A | 8/1992 | Bernard |
| 5,182,767 | A | 1/1993 | Bernard |
| 5,204,902 | A | 4/1993 | Reeds, III et al. |
| 5,216,716 | A | 6/1993 | Bernard |
| 5,583,933 | A | 12/1996 | Mark |
| 5,610,886 | A * | 3/1997 | Hayashi et al. ............ 369/44.29 |
| 5,751,765 | A | 5/1998 | Matsubara |
| 5,822,278 | A | 10/1998 | Ohshima et al. |
| 6,023,779 | A * | 2/2000 | Fullam et al. ................. 714/751 |
| 6,060,332 | A | 5/2000 | Martin |
| 6,105,006 | A | 8/2000 | Davis et al. |
| 6,236,724 | B1 | 5/2001 | Labaton et al. |
| 6,272,228 | B1 | 8/2001 | Martin |
| 6,283,367 | B1 | 9/2001 | Matthew et al. |
| 6,311,306 | B1 | 10/2001 | White et al. |
| 6,317,398 | B1 * | 11/2001 | Shimada .................... 369/47.32 |
| 6,340,938 | B1 * | 1/2002 | Nakagawa ...................... 341/58 |
| 6,377,670 | B1 | 4/2002 | Rosset et al. |
| 6,421,431 | B1 | 7/2002 | Ball et al. |
| 6,445,780 | B1 | 9/2002 | Rosset et al. |
| 6,594,052 | B2 * | 7/2003 | Hiramatsu et al. ............ 398/140 |
| 6,607,136 | B1 | 8/2003 | Atsmon et al. |
| 6,765,930 | B1 * | 7/2004 | Oikawa ........................ 370/479 |
| 6,904,520 | B1 | 6/2005 | Rosset et al. |
| 7,107,513 | B1 * | 9/2006 | Yamauchi .................... 714/795 |
| 7,239,625 | B1 * | 7/2007 | Tse et al. ...................... 370/349 |
| 2002/0047049 | A1 | 4/2002 | Perron et al. |
| 2006/0136544 | A1 | 6/2006 | Atsmon et al. |

\* cited by examiner

US 7,992,067 B1

METHOD OF IMPROVING SUCCESSFUL RECOGNITION OF GENUINE ACOUSTIC AUTHENTICATION DEVICES

RELATED APPLICATIONS

The present application is a continuation of U.S. patent application Ser. No. 10/291,195, filed Nov. 8, 2002, now abandoned, which claims the benefit of U.S. Provisional Application No. 60/348,212, filed Nov. 9, 2001, U.S. Provisional Application No. 60/337,514, filed Dec. 6, 2001, U.S. Provisional Application No. 60/344,174, filed Dec. 27, 2001, and U.S. Provisional Application No. 60/371,821, filed Apr. 11, 2002, each of these related applications hereby being incorporated by reference herein.

FIELD OF THE INVENTION

This invention relates to acoustic authentication devices, namely devices capable of generating sound sequences which are mainly used to establish that someone possesses a genuine device and is thus authorized to access something. More specifically, the present invention relates to the structuring and extracting data strings being transmitted in a sound sequence over a communication medium so as to improve the rate of successful recognition of a genuine acoustic authentication device at the receiving end.

The invention also relates to the detection of variations in the voltage supplied by an internal battery or batteries within acoustic authentication devices.

BACKGROUND

Authentication devices are useful in a wide variety of applications. These devices are often referred to as "smart cards" since they are usually in the form of cards and they have the ability of performing certain tasks, unlike any conventional cards such as ordinary debit cards or credit cards. When constructed as cards, authentication devices are generally built in accordance with the ISO 7816 standard.

An acoustic authentication device is a specialized kind of authentication device. Unlike other authentication devices, an acoustic authentication device does not require a specialized terminal to transmit information. The information is rather transmitted as a sound sequence to be received through acoustic coupling by an acoustic interface, such as a telephone handset, a microphone or any other suitable communication terminal. The sound sequence emitted by an acoustic authentication device is ultimately transmitted to a transaction system. The sound sequence is then analyzed to extract the data string containing the information and determine whether it is genuine or not. When a successful recognition is made, the device holder usually receives an access or another privilege, depending on the exact situation. For instance, the device holder may gain access to a computer system, a door, a long distance call, etc. Acoustic authentication devices have many advantages over non-acoustic authentication devices such as conventional smart cards. Among other things, they do not require a special and usually costly terminal. They can be used virtually anywhere a telephone or any other device equipped with a microphone is available.

When acoustic authentication devices are used, various factors can affect signal recognition at the transaction system. The success rate of correctly transmitting a sound sequence is generally limited by the quality of the terminal and by the transmission channels that form the communication medium. These elements may unfortunately affect the sound sequence and prevent the transaction system from obtaining a successful recognition even if it originates from a genuine acoustic authentication device. Among the possible problems that may affect transmitted sound sequences, there are:

- interference produced by the transmission channels and which can be misinterpreted by signal processing tools at the receiving end;
- ambient noise which induces a bad signal-to-noise ratio, especially when the devices operates with frequencies in the telephone band;
- important variations in the signal amplitude, or even a loss of signal, caused by the movement of hand-held devices by its user, the probability of such movement occurring during transmission of the sound sequence being directly proportional to the length thereof;
- communication interruptions (especially on cellular phones) which can lead to a loss of data;
- frequency shifting due to the transmitting device constraints;
- noise cancellation (or attenuation) on terminals like cellular phones that can affect signals like FSK;
- variation over time of the frequencies generated by some microchips used in acoustic authentication devices; and
- the variation in frequency response between piezoelectric elements used in various acoustic authentication devices.

Another problem with acoustic authentication devices is concerned with the use of batteries therein. A self-powered acoustic authentication device uses one or more batteries to provide the electric power required for the microchip and other components to function. Since most of these devices are generally in the form of thin cards, they are provided with very small non-replaceable batteries embedded therein. The problem is that it is not always possible to obtain a constant voltage level from the battery or batteries. Typically, the output voltage level of a battery progressively decreases until the device cannot work anymore. A battery also looses some power even when the device is not used. The life expectancy is thus directly dependant on either the number of times the device is activated and on the time since the device was initially put in operation.

Almost all acoustic authentication devices are autonomous and rely on an internal clock to time their microchip and generate the sound sequences. When no internal crystal can be used for the clock because of size constraints, which is presently the case for devices built as ISO 7816 cards, the problem is that the internal clock frequency usually decreases when the supplied voltage decreases. Thus, when generating sound sequences, a frequency drift may appear over time, eventually making it more difficult to obtain high recognition rates during signal processing at the transaction systems.

Furthermore, it was difficult to provide a way, built on or into the device, to estimate the exact remaining battery life, without using additional components which increase the overall unitary cost of the device. Whenever a non-replaceable battery is empty in a device, the device holder must obtain a new device to resume normal activities. This may be problematic if it is not known in advance when a device will cease to work or if the frequency drift is too important to ensure a successful recognition by the transaction system.

SUMMARY

The present invention is concerned with a method of improving the likelihood of having a successful recognition of a digital data string originating from a genuine acoustic authentication device. The method comprises at least two structuring techniques which are used at the device itself and corresponding extracting techniques at the transaction system to minimize the effect of errors, for example errors due to noise.

Another aspect of the present invention relates to provide a way for estimating the remaining life of an internal battery or internal batteries, this also improving the likelihood of having a successfully recognition of a genuine acoustic authentication device.

These and other aspects and advantages of the present invention are described in or apparent from the following detailed description of a preferred embodiment made in conjunction with the accompanying figures.

DETAILED DESCRIPTION

Figure 1:
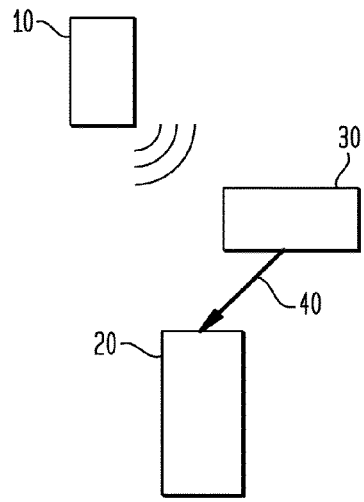
FIG. 1 is a schematic view showing an example of an acoustic authentication device transmitting a sound sequence to a transaction system over a communication medium.

FIG. 1 illustrates an example of an acoustic authentication device (10) communicating a data string to a transaction system (20). Such device (10) is typically in the form of a hand-held card, more particularly a card built in accordance with the ISO 7816 standard. The device (10) is said to be an acoustic authentication device since its purpose is to emit a sound sequence to be received and read by the transaction system (20). The sound sequence is emitted by the device (10) using an integrated acoustic transducer or the like. When emitted, the sound sequence is first received by a terminal (30), for instance a telephone handset, a microphone or any other apparatus capable of receiving the sound sequence through acoustic coupling. The device holder simply holds the device (10) near the terminal's input and activates the device (10), usually by depressing an activation button thereon. The sound sequence is transmitted to the terminal (30) by acoustic coupling and then to the transaction system (20) using an appropriate communication medium. Depending on the situation, the communication medium can be, for instance, a simple wire or a connection using a conventional telephone network or a data network, possibly including the Internet.

The expression "transaction system" means any computer or cluster of computers, as well as any similar systems, carrying out the tasks of authentication and the ones related to the transaction itself. The term <<transaction>> relates to any relevant task and is not limited to monetary transactions. For instance, it may include granting an access, such as unlocking a door, or anything else of similar nature. Further, the expression "authentication device" includes cards, tokens or any other devices for which the present invention may be useful.

Acoustic authentication devices are similar to other authentication devices, with the exception that they have an acoustic interface to enable communication with the transaction system. These devices are unidirectional, although it is possible to provide a bidirectional interface using appropriate design. The sound sequence emitted from the device contains the data string. It should be noted that some devices may be provided with both an electrical and an acoustic interface.

Many problems may affect the transmission of sound sequences from the acoustic authentication device (10) and the transaction system (20). The main goal of the present invention is thus to maximize the chances of having a successful recognition by the transaction system (20) of a data string contained in a sound sequence emitted by a genuine acoustic authentication device (10).

Transmission

The method used for achieving a successful transmission starts within the device (10). The device (10) initially generates a digital data string containing the information to be transmitted. The information is generally enciphered using any desired encrypting techniques known in the art and changes after each use. The information is enciphered to ensure that the information remains secret and that no one can find a subsequent valid data string. Nevertheless, it is possible to use the present invention with devices emitting non-encoded data strings or even fixed data strings.

Once the digital data string is formed or read in a memory and possibly enciphered, the device (10) structures the data string using at least two of the following techniques performed at the device (10). The data string is initially in a binary form and is later transformed as frequency value to be emitted by the acoustic transducer of the device (10). The digital data string will be contained in the sound sequence and transmitted in that form to the transaction system (20).

It should be noted that the structuring of the digital data string is made using at least two structuring techniques. One of these techniques must include at one point a modulation of the digital information in the data string.

Error Coding

A first possible structuring technique is an error coding technique, such as BCH or Hamming coding. The error coding is implemented by adding error correction bits to the digital data string before modulation. These correction bits will be used to detect errors that may have occurred during transmission and enable to correct at least some of these errors at the receiving end.

The following example illustrates error coding. In this example, the Hamming coding uses a block parity scheme that allows the correction of a one-bit error to the word D, which word comprises the following bits:

d8, d7, d6, d5, d4, d3, d2, d1, where d8 is the most significant bit.

It is to be noted that the present invention is not limited to 8-bit data words since words of other lengths could be used in data strings as well.

Hamming coding is usually specified by two parameters in parenthesis, namely Hamming(a, d), where "a" is the total number of bits, including the correction bits, and "d" is the number of data bits. For the purpose of this example, a "pseudo"-Hamming(12, 8) is used. There are thus four correction bits, also sometimes called parity bits, which may be referred to as p1, p2, p3, p4. These correction bits are added, in the reverse order, to the data bits. The word becomes a 12-bit word, referred to as A, and comprises bits:

d8, d7, d6, d5, d4, d3, d2, d1, p4, p3, p2, p1.

Briefly stated, correction bits allow to "recalculate" the value of a given bit if an error occurred in the transmission of that bit. Depending on the kind of error coding and the number of correction bits, more than one data bit can be recalculated. It should be noted that error coding techniques per se, such as BCH or Hamming coding, are well known in the art and need not to be further explained herein.

Interlacing

A second possible structuring technique is to "interlace" the bits in the words to be transmitted before modulation. This technique is complementary to error coding and offers many advantages. Since error coding techniques allow correction of only a limited number of bits per word, interlacing reduces the risk of having an error, occurring at a particular point in time during the transmission of the sound sequence, affecting two or more bits of a same word. Therefore, it allows an error to be "spread" over a plurality of words. This has the double advantage of reducing the number of misinterpreted bits in a word, and being capable of tolerating burst errors. Having one or a very limited number of bits per word being affected by an error facilitates the correction of the error using an error coding technique at the receiving end.

Interlacing is the repartition of bits into rearranged groups. For example, using 12-bit words and assuming that six words are to be interlaced, interlacing may create six new words with mixed bits. Of course, the way these bits are mixed is known by the transaction system to which they are to be ultimately transmitted and then decoded. It could be either by always using the same interlacing pattern or by transmitting an information indicative on the way the interlacing is made.

Using the example, the transposition interlaced word may look as follows, assuming the notation Ai,j where "i" is the rank of the bit in the word before interlacing and "j" is the rank of the bit within that word:

A1,1 A2,1 A3,1 A4,1 A5,1 A6,1 A1,2 A2,2 A3,2 A4,2 A5,2 A6,2

A1,3 A2,3 A3,3 A4,3 A5,3 A6,3 A1,4 A2,4 A3,4 A4,4 A5,4 A6,4

. . .

A1,11 A2,11 A3,11 A4,11 A5,11 A6,11 A1,12 A2,12 A3,12 A4,12 A5,12 A6,12

Figure 2:
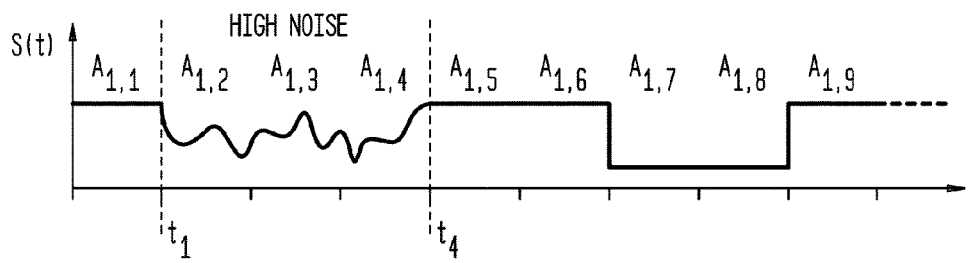
FIG. 2 is a graph showing an example of a transmission without interlacing.
Figure 3:
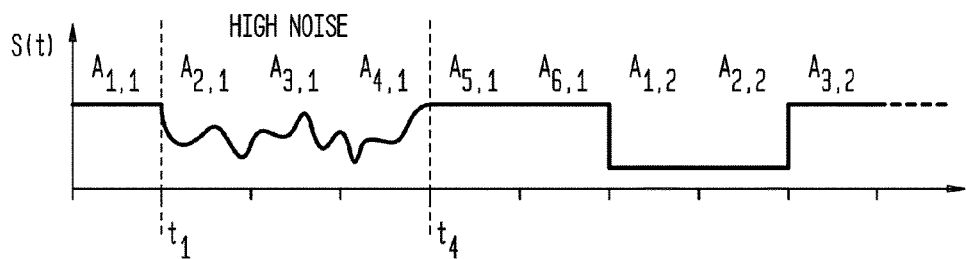
FIG. 3 is a graph showing an example of a transmission using interlacing.

FIGS. 2 and 3 illustrate the main advantage of interlacing. In the illustrated example, a high noise occurs while data words are being transmitted, more specifically between time values t1 and t4. This high noise may be the result of a noise on the telephone line, which then causes an error for every bit of data transmitted during that time period. Without interlacing, as illustrated by FIG. 2, three consecutive bits (A1,2, A1,3, A1,4) from the same word are affected. This results in an unsuccessful recognition if the error coding used can only correct one bit per word. However, with interlacing, as illustrated by FIG. 3, the three consecutive bits (A2,1, A3,1, A4,1) affected by the high noise are each part of three different words, in which case the error coding can be successfully used to correct the corrupted bits.

Frequency Coding

A first possible modulation structuring technique is to code more than one bit on one or more frequencies. This technique can be used with or without the preceding techniques. It allows the reduction of the overall length of the sound sequence and improves the robustness of the signal-to-noise ratio in comparison to using one frequency to code one bit.

For example, the bits of the words can be grouped in such a way as to be transmitted as triplets. Each triplet will in turn be coded on two frequencies ($F_i$, $F_j$), each frequency being emitted for a given length of time.

For example, the first word to be transmitted:

A1,1 A2,1 A3,1 A4,1 A5,1 A6,1 A1,2 A2,2 A3,2 A4,2 A5,2 A6,2 can be grouped into four triplets, namely:

(A1,1 A2,1 A3,1), (A4,1 A5,1 A6,1), (A1,2 A2,2 A3,2) and (A4,2 A5,2 A6,2).

Each triplet can then be represented by its decimal equivalent by applying the following conversion function T( ) to it:

$$T(B3,B2,B1)=B3*4+B2*2+B1$$

B3 being the most significant bit.

Since the decimal equivalent of a 3-digit binary number has values between 0 and 7, four different frequencies, in pairs, could be used to represent all height possible triplets. The frequency pairs associated with the triplets could be as follows:

| T | Fi | Fj |
|---|----|----|
| 0 | F1 | F2 |
| 1 | F4 | F2 |
| 2 | F2 | F3 |
| 3 | F4 | F3 |
| 4 | F1 | F4 |
| 5 | F3 | F4 |
| 6 | F2 | F1 |
| 7 | F3 | F1 |

Thus, for example, assuming that the first 12-bit word is 1, 0, 1, 0, 0, 1, 1, 1, 0, 1, 1, 1, the four triplets are: (1, 0, 1), (0, 0, 1), (1, 1, 0) and (1, 1, 1). The corresponding decimal values of the four triplets are then:

$$T(1,0,1)=1*4+0*2+1=5,$$

$$T(0,0,1)=0*4+0*2+1=1,$$

$$T(1,1,0)=1*4+1*2+0=6, \text{ and}$$

$$T(1,1,1)=1*4+1*2+1=7.$$

Following the frequency pairs table, the resulting frequency pairs are (F3, F4), (F4, F2), (F2, F1) and (F4, F2). This means that the twelve bits of data would be transmitted as eight successive frequencies, respectively of frequencies F3, F4, F4, F2, F2, F1, F4 and F2, thereby reducing the length of the sound sequence.

Probabilistic Transition Coding

Another modulation structuring technique is to use particular frequency assignation patterns for the bits to be transmitted. By using such specific frequency assignation patterns, it may be possible to statistically determine which frequency is most likely to follow a given frequency at any given time. This provides the possibility of correcting an error at the receiving end if, for example, a frequency is lost.

The principle underlying the technique makes use of Markov chains, where the probability of encountering a given frequency only depends on the previous encountered frequency and the transition probability from that frequency to the given one. This means that by using a specific frequency assignation pattern, it is possible to obtain a transition probability matrix revealing which frequency (or frequency pair)

has a higher probability of appearing after another given frequency (or frequency pair) in the case where such a frequency (or frequency pair) is missing due to an error in the sound sequence. Thus, when a received frequency is indecipherable, the previous correctly received frequency can be used, in conjunction with the transition probability matrix, to determine which frequency is the most likely to be the one following the last correctly received frequency.

For instance, continuing with the ongoing example where four triplets are encoded, namely T(1, 0, 1)=5, T(0, 0, 1)=1, T(1, 1, 0)=6 and T(1, 1, 1)=7, it is possible to use the following frequency assignation table:

| Encoding | | A | B | C | D |
|---|---|---|---|---|---|
| Triplet | Next Encoding | | Frequency pair | | |
| 0 | A | F1,F2 | F2,F1 | F2,F2 | F3,F1 |
| 1 | | F4,F2 | F2,F4 | F3,F2 | F3,F3 |
| 2 | B | F2,F3 | F3,F2 | F1,F3 | F1,F1 |
| 3 | | F4,F3 | F3,F4 | F3,F3 | F1,F4 |
| 4 | C | F1,F4 | F4,F1 | F2,F4 | F2,F2 |
| 5 | | F3,F4 | F4,F3 | F4,F4 | F2,F3 |
| 6 | D | F2,F1 | F1,F2 | F1,F1 | F4,F2 |
| 7 | | F3,F1 | F1,F3 | F4,F1 | F4,F4 |

In the example, the encoded values of the triplets have the successive decimal values of "5, 1, 6, 7", as previously indicated. Using the above assignation table, the resulting frequencies will be F3, F4, F3, F2, F2, F1, F4 and F4 (i.e. triplet 5, encoding A, gives frequencies F3, F4 and next encoding C, then triplet 1, encoding C, gives frequencies F3, F2 and next encoding A, then triplet 6, encoding A, gives frequencies F2, F1 and next encoding D, and finally, triplet 7, encoding D, gives frequencies F4, F4).

It is important to note that the preceding example used only a preferred embodiment of the frequency assignation scheme in order to get optimal results when statistically analyzing and rearranging the received data string, other embodiments being possible. Other parameters may be used as well, for example different length Markov chains, different number of encodings, different frequency pairs, etc.

Silence Between Bytes

Another possible structuring technique is to add a silence (for example having a length of about 75 ms) between bursts of words (for example between every 6 words) after modulation. This decreases the risk of having a valid signal interpreted as noise. For instance, since an increasing number of cellular phones include noise suppressors that remove everything recognized as noise, adding one or more silences between every few words can solve reset noise cancellation procedures and allow the full sound sequence to be transmitted.

Generation of the Frequency Templates

Samples of the frequency used in the data string can be added to the transmitted signal as a frequency template and will be received at the transaction system. The template can be added at the beginning or the end of the modulated data string, possibly even more than once.

Figure 6:
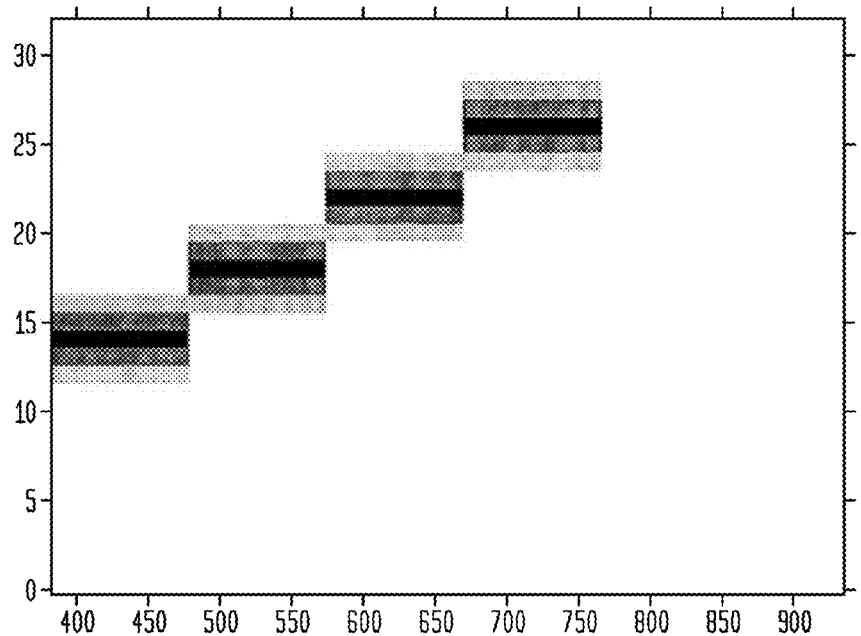
FIG. 6 is a graph showing an example of a frequency templates mask spectrum.
Figure 7:
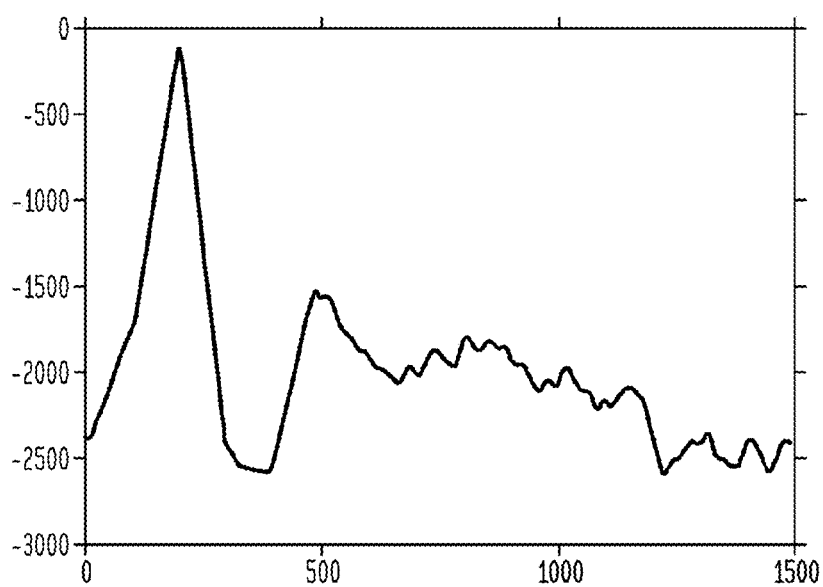
FIG. 7 is a graph showing an example of maximum correlation between a coded message spectrum and the frequency templates mask spectrum.

The first step in the generation of the frequency templates is to digitize the modulated data string. The second step is to transform modulated data string in frequency domain. The third step is to apply a frequency templates mask on the transformed signal. FIG. 6 shows an example of a frequency templates mask where the darker regions indicate increasing energy values for each present frequency component (on a 100 Hz scale) as a function of time (on a ms scale). At the receiving end, a mask will be applied along the signal to detect the maximum of correlation between the mask and the signal. FIG. 7 illustrates an example of correlation between a frequency templates mask spectrum and a given sound sequence spectrum where the vertical axis represents the weighted sum of the spectral energy of the sound sequence as a function of time (on a ms scale). The point with the highest weighted sum is normally the beginning of the frequency templates pattern.

Start and End Frequency Patterns

Using redundancy by using both starting and ending frequency templates pattern, allows to go further than simply using the frequency template. It is possible to find the optimum distance between the 2 maximum (start and stop of the sequence) and avoid the detection of a false frequency templates pattern. A further possible technique, which can be used with any of the other structuring techniques, is to place predetermined frequency patterns before and/or after the valid data, following a signal mask that is fixed (except in frequency). For example, during T1 ms, the frequency Fi is emitted, then frequency Fj is emitted during T2 ms, (F1, T1) and (Fj, T2) compose the pattern. A particular pattern can use one or more frequencies transmitted for a given time. This can be used to:

detect the beginning and/or the end of the data string, and therefore cut off the unwanted part of the signal;
  measure the frequencies contained in the pattern and the time for which they are emitted in order to adjust the processing parameters (such as the time base) and detect the other frequencies, all this allowing the computing of the real time base of the signal and thus, improving signal processing performance (a parallel can be made between the pattern frequencies and the real frequencies); and
  perform the detection of the data string in real-time and trigger the recording by, for example, an Interactive Voice Response system or a computer.

Reception

Extraction of the digital data string, including demodulation, is done at the receiving end. It should be noted, however, that the extraction is complementary to the structuring at the device (10). It mainly uses reverse techniques in effort to obtain a digital data string identical to the original. The data string will be deciphered afterwards, if required. It should also be noted that the step of extracting the data string, as meant within the context of the present invention, may be achieved at another device before reaching a main server of the transaction system (20). This does not change the nature of the present invention.

Correlation

Time analysis of a signal can be affected by noise and amplitude variation. The solution is to use a combined time/frequency analysis in order to overcome this problem.

When a transmitted modulated data string includes one or more frequency templates, extraction of the data string is facilitated. This is obtained by using appropriate segmentation of the incoming data string.

Figure 4:
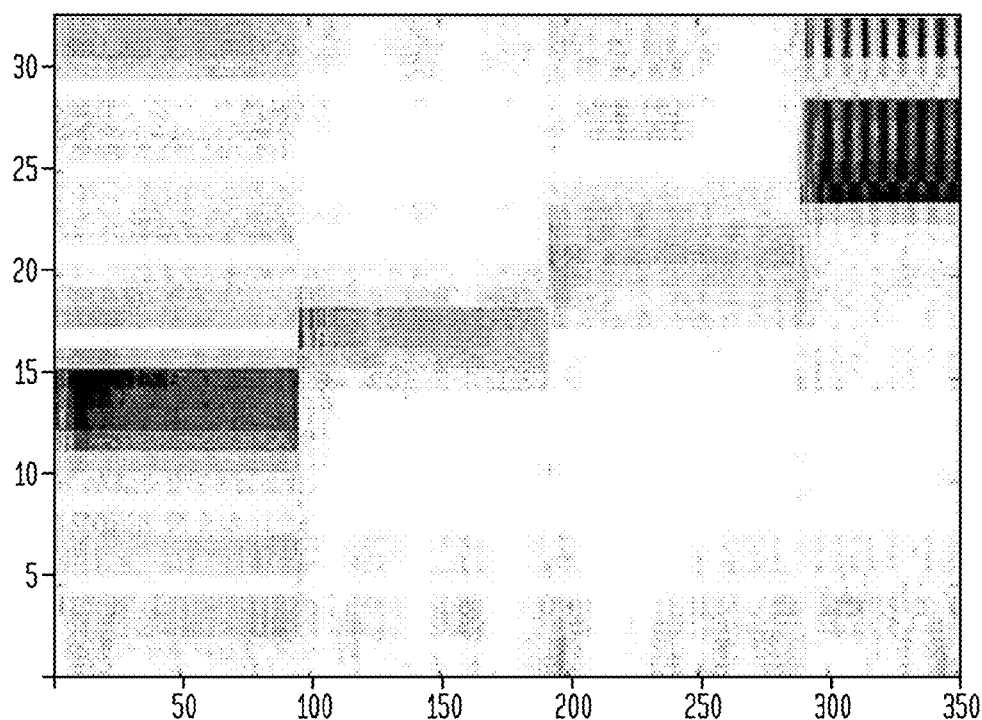
FIG. 4 is a view showing an example of a frequency templates spectrum.
Figure 5:
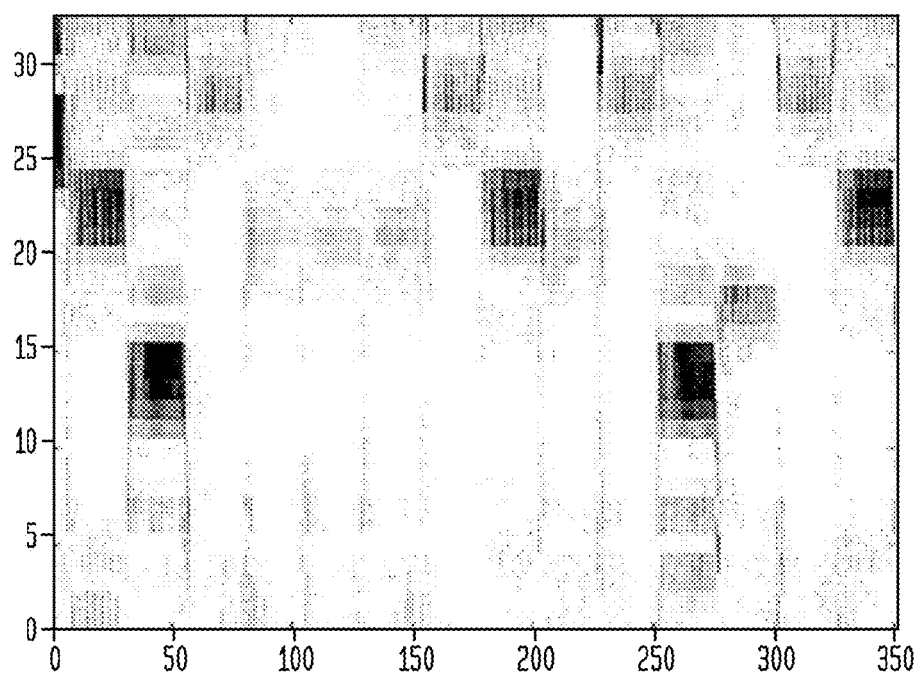
FIG. 5 is a view showing an example of a coded message spectrum.
Figure 8:
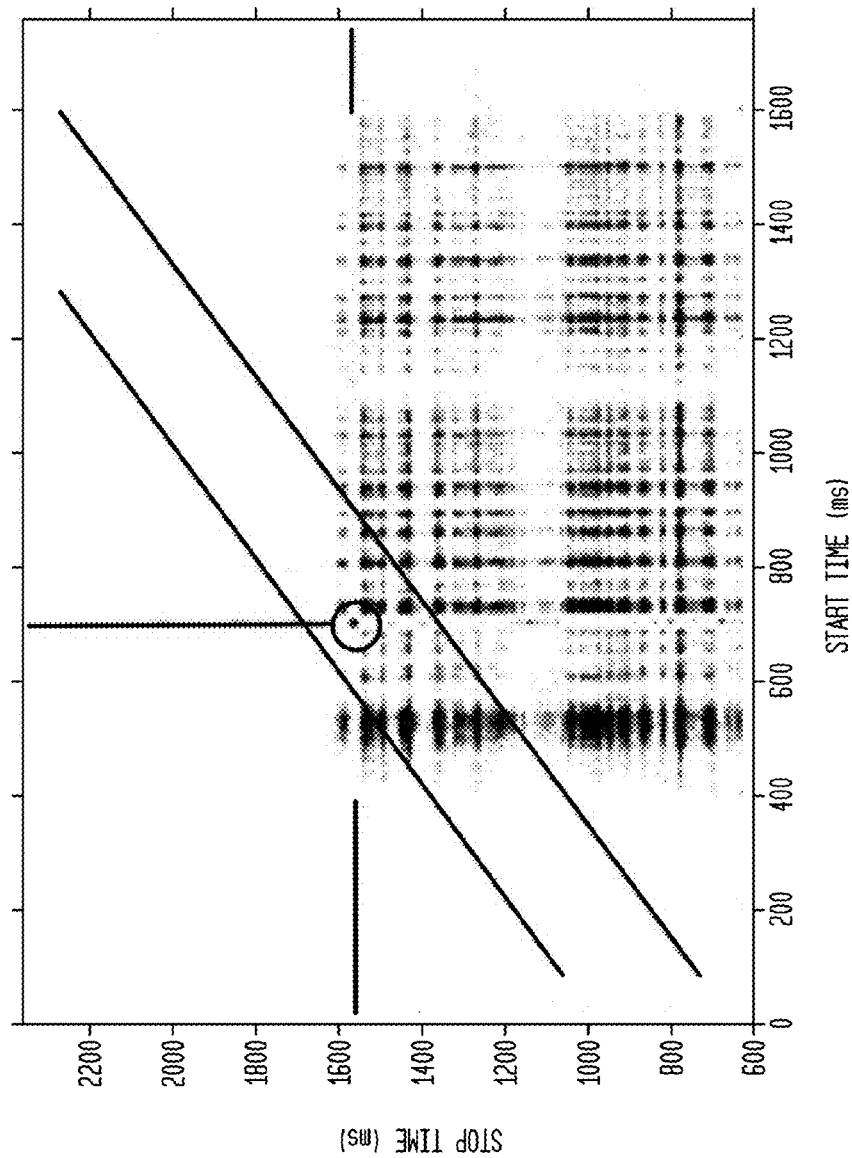
FIG. 8 is a graph showing an example of maximum correlation between a coded message spectrum and the frequency templates mask spectrum with both start and stop patterns.

FIGS. 4 and 5 show the spectrums of the frequency templates and the received data string where the darker regions indicate increasing energy values for each frequency component (on a 100 Hz scale) detected as a function of time (on a ms scale). When a frequency template, shown in FIG. 4, is detected, it is stored as samples of each frequency. The number of points for each sample directly depends on the pattern and on the sampling rate. With one or more stored samples, it is possible to make a correlation between them and the received data string, which is shown in FIG. 8. The given results will allow to know what are the positions of each frequency in the signal. FIG. 8 illustrates with the level of correlation between the frequency templates mask spectrum and a given coded message spectrum having the start and end times indicated by the X and Y axis.

If the complete signal has start and/or end frequency templates, the issue is to detect segments and store them in memory using spectral analysis.

Frequency Decoding

If frequency coding is used at the device (10), then the frequency decoding must occur at the transaction system. Frequency decoding is then simply achieved in reverse to find the triplets, and then the values of each bit.

Probabilistic Transition Decoding

If the modulated data string uses a Markov chain scheme in its structure, then the Markov chain decoding technique must be used at the receiving end. The rearrangement preferably starts at the end of each chain. What is computed is the probability of the ending link for each Markov encoding. Only the best value is kept. It should be noted that the rearrangement could also be applied starting at the beginning of the chain in an inverse way.

The next step is to go back from the last link to the first one of the chain. For each link and for each encoding. The probability of the link is computed (e.g. of a pair of frequencies or of one frequency, depending on the frequency encoding). This local probability will be multiplied with the probability of the following sub chain.

For example, assuming the encoding is that shown in the table presented earlier, if the pair of frequencies is (F1, F2) with A encoding, the next link will also be in A encoding. The (F1, F2) probability with A encoding is multiplied with the higher probability of the sub chain in A encoding. When reaching the beginning of the chain, the first link must be in A encoding. The combination of the frequency pair in A encoding and the following sub chain having the highest probability of occurrence must be found.

Error Correction

This technique performed at the receiving end after demodulation if error coding was done at the device (10). As aforesaid, error coding can allow to detect and recover bits in a corrupted signal. However, correction brought by coding schemes (BCH, Hamming code) is limited to a given number of bits.

The implementation of this can be done by a computation of the error coding once the bytes have been "corrected". For example, for a "pseudo-Hamming"(12,8) coding, it is possible to correct 1 bit with 100% certainty. If the transmitted word is 100000001111 instead of 100000001101, it can be corrected. However, if it is 100010001101, the correction may not be accurate. This is why it could be interesting to add a "checksum" of the byte. It is possible to validate the corrected occurrence by computing the checksum. For our example, if the corrected occurrence is 001110001100, the checksum can allow to detect the presence of a difference between both words (before and after the correction, there are more than two different bits). So the word will be rejected and the transaction system (20) will know that the transmission of the sound sequence is too corrupted to be used.

De-Interlacing

If interlacing is used at the device (10), then a reverse technique must be used at the receiving end. The de-interlacing technique is done prior to error correction. The order of the bits is then rearranged in accordance with the interlacing pattern.

EXAMPLE

The following examples use certain assumptions about the data strings:

the data string contains samples of frequencies used at the beginning and at the end of the signal in a known order (in the form of headers);

the data string must be rearranged through a mixture of convolution coding and bits/frequencies redundancy coding scheme that depends on the convolution machine state;

the de-convolved data string is interlaced; and the de-interlaced data string has error correction code.

Figure 9:
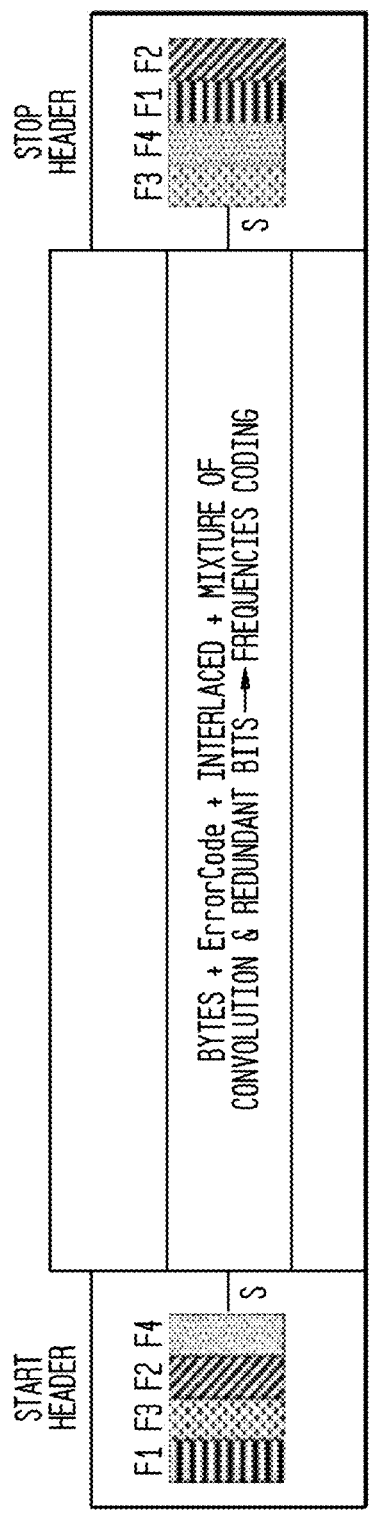
FIG. 9 is a schematic view showing an example of the structure of a data string.

FIG. 9 schematically represents the structure of the data string in the example.

The rearrangement then has the following steps:

computing the spectrum of the data string and normalizing for frequency-dependant amplitude variations due to the acoustic authentication device or the communication medium;

finding the time-position of the beginning and end of the data string and extracting the frequency templates;

partitioning the data string and estimating probabilities for each frequency in each block;

de-convolving the frequency sequence and finding the most likely bits sequence;

de-interlacing and applying error correction mechanism; and evaluating the solution and re-iterating the rearrangement, if necessary.

Computing the Spectrum

The first step of the rearrangement is to generate the spectrum of the data string. The spectrum must have some specific properties in order to achieve the desired goal. Assuming a distance $\Delta f$ between the frequencies emitted by the device, the spectrum must have a frequency resolution of at least ½ $\Delta f$. Also, assuming that each frequency-bit is emitted for an interval of time te, the time window used to compute a Fast Fourier Transform (FFT) should not be more than ⅔ te in length. If the time window is too short for the frequency resolution needed, the sample vector is padded with 0's to the proper length. Finally, the time step $\Delta t$ between the beginning of each FTT window should be such that at least few FFT vectors represent the emission interval te. If the device generates square waves, harmonics of the fundamental frequency could be used instead or in conjunction with the fundamental frequency.

For example, if four equally spaced frequencies are used between 2333 Hz and 3333 Hz, then $\Delta f=333$ Hz. If each frequency is emitted for te=6 ms and the sampling rate is 8 KHz, a window of 4 ms (32 samples) padded with 0's into a vector of 64 samples is used to get a frequency resolution of 125 Hz. In order to have few representative of a 6 ms block, a frame advance at each one millisecond should be done in order to create an FFT vector for every ms (i.e. $\Delta t=1$ ms) or equivalently each 8 samples.

In order to filter the unnecessary signal, only the relevant frequencies portion of the spectrum needs to be computed (or maintained). If the frequencies used can vary by about 10% from time to time (var=10%), or from device to device, than only the portion of the spectrum containing those target frequency variations are required. For example, for 2333 Hz to 3333 Hz, it would only be necessary to kept energy for frequencies between around 2125 Hz and 3625 Hz.

Because acoustic authentication devices themselves or the communication medium may affect the amplitude of certain frequencies, some amplitude normalization is desired. This normalization is done by finding, for each frequency band of the spectrum, the highest level of energy, and by dividing every elements of that band by this higher level of energy. See equation 1 below:

$$E_n(t, f) = \frac{E(t, f)}{\max_t\{E(t, f)\}} \quad \text{(equation 1)}$$

where E(t, f) is the energy in the spectrum at time t and for frequency f and $E_n(t, f)$ is the energy after normalization.

Finding the limits of the modulated data string

The example assumes that the data string has two headers (one at the beginning and one at the end), each being made of a sequence of frequencies (or silence) F1, F2, . . . , Fn, emitted for durations of D1, D2, . . . , Dn. Moreover, the frequencies may vary from sequence to sequence by var (=10%). It is assumed that they all vary at the same time and by the same amount. For example, 2333 Hz, 2667 Hz, 3000 Hz and 3333 Hz may all be 2300 Hz, 2633 Hz, 2967 Hz and 3300 Hz for a specific sequence.

Figure 10:
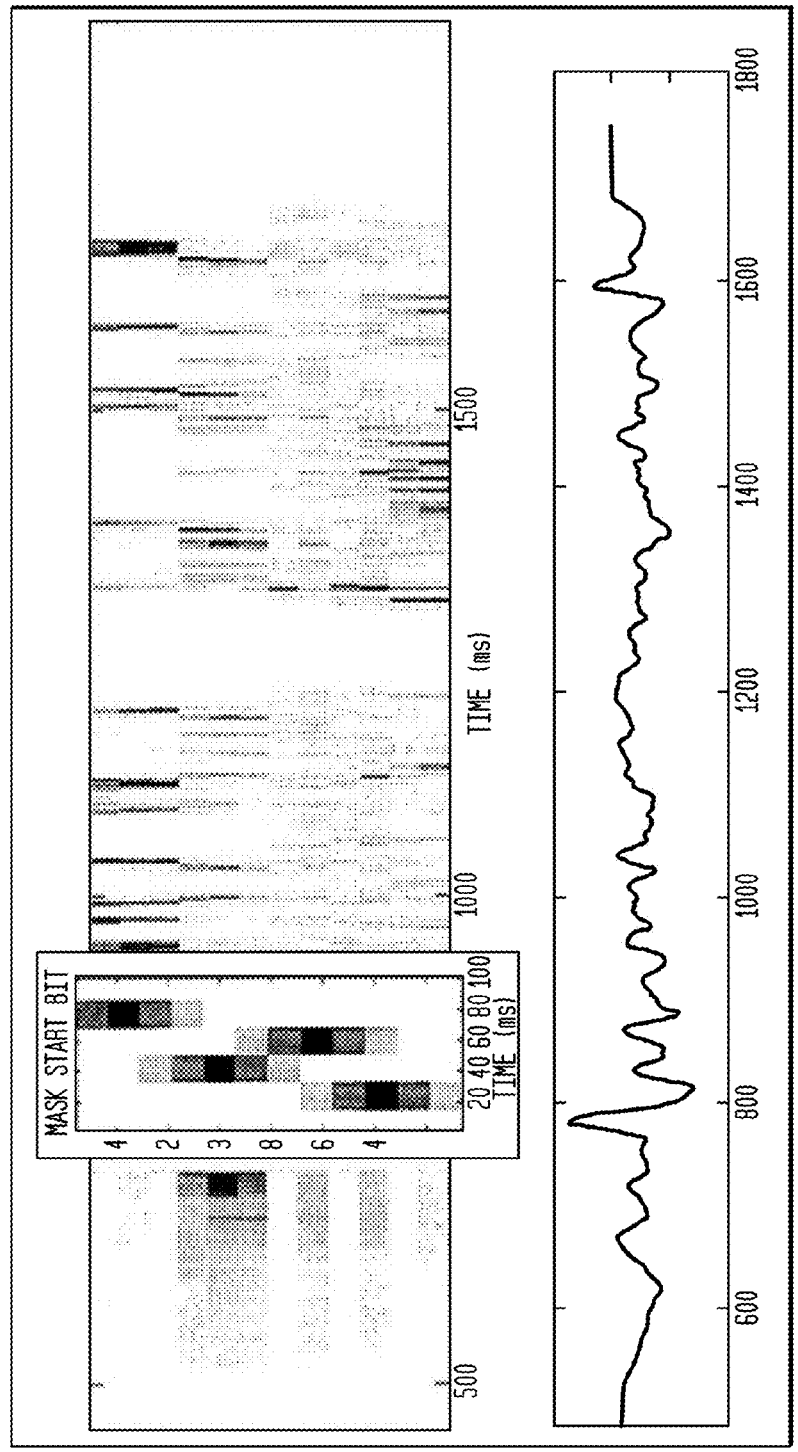
FIG. 10 is a graph showing an example of the score function $S(\tau)$ when a mask is applied on the spectrum.

The method consists in generating a mask that will act as a header detector over the whole signal. This mask is a weight matrix that will be put on the spectrum at a given time alignment and will be use to compute a weighted sum of the spectral energy. That weighted sum, for alignment T, gives a fit score for the header S(T). Better is the score, closer is the emitted sound to the expected header. The mask is made of negative weights (−1) when silence is expected. When frequency Fi is expected, a high positive weight (2) is given to that frequency. Weights of surround frequencies decrease linearly in the range of var. FIG. 10 shows the score function S(T) for a header applied.

Figure 11:
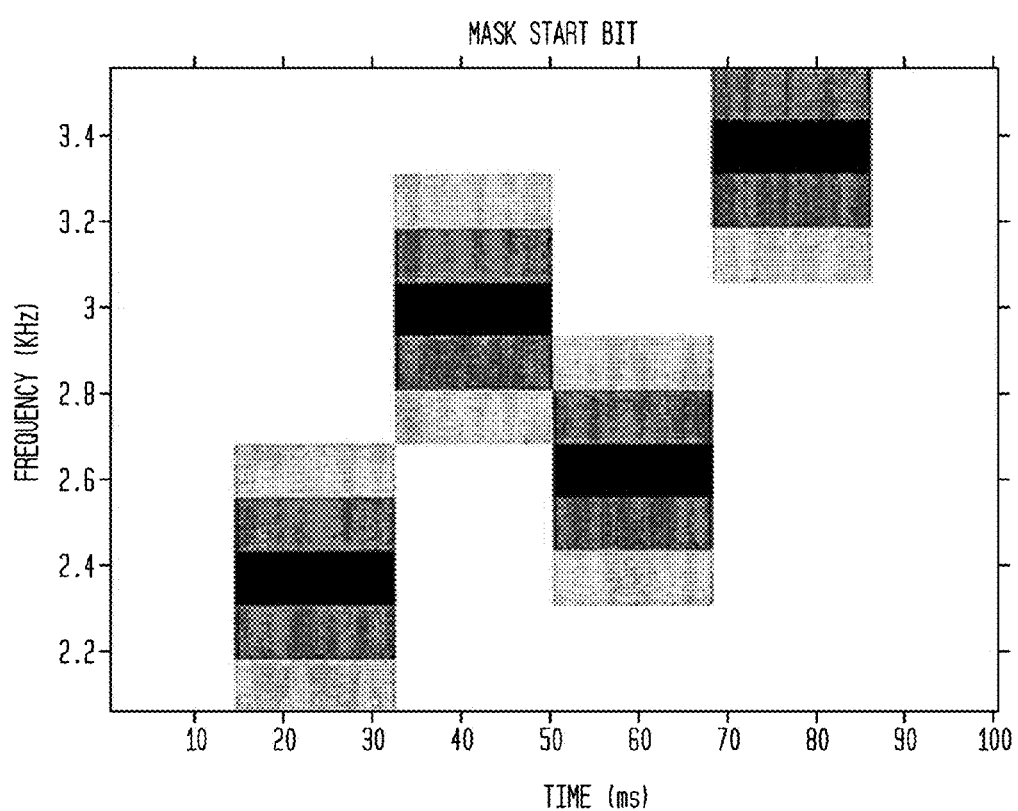
FIG. 11 is a graph showing an example of a header mask.

For example, if the frequencies 2333 Hz, 2667 Hz, 3000 Hz and 3333 Hz are used with var=5%, and the sequence is: [(silence@14 ms), (2333 Hz@18 ms), (3000 Hz@18 ms), (2667 Hz@18 ms), (3333 Hz@18 ms), (silence@18 ms)], the mask showed in FIG. 11 can be obtained. The highest weights at expected frequencies have value of 2, weights nearby (in frequency), value of 1, and weights two bands apart, a value of 0. All other weights get a value of −1. When harmonics are used, positive weights must take into account the harmonic amplitude reduction accordingly. For example, if the third harmonics is used, positive weights must be multiplied by a factor of 3.

Assuming the data string has length ls including headers of length lh, if the recording has length l, the score for the first header must be computed for the first l−(ls−lh) portion of the recording, and similarly, the final header for the final portion of the same length. Let S(T1, T2)=S1(T1)+S2(T2) be the score for the start (1) and stop (2) headers placed at time position T1 and T2 respectively. The value of T1 and T2 for which S is maximal indicates the most likely position of the headers in the recording. Note that assuming var=10%, only values of T1 and T2 are of interest, such that (ls−lh)*(1−var)<T2−T1< (ls−lh)*(1+var). FIG. 8 shows an example of the values of S(T1, T2) for a given recording, interesting pair of positions lies between the two diagonal lines. In this example, the best pair of positions is circled.

Then all those values of interest are placed in a heap for further reference. The pair (T1, T2) with highest score gets the first place into the heap. This pair will be use to position the data string in the recording and to estimate the real deviation of the frequencies. This deviation is not used to recognize frequencies, but to estimate the compression or dilation of each block of emission.

Given these references, FFT vectors of the frequency used are extracted from the sequence headers. For each frequency used, an average FFT vector is computed. Those prototypes (say $\vec{p}_1, \ldots, \vec{p}_m$) will be use to recognized the frequency emitted for each block. If the overall recognition fails, the next best pair (T1, T2) into the heap can be use.

Estimating Probabilities for Each Frequency in Each Block

Once the position of the headers is found, the spectrum of the data string is partitioned into blocks of emitted frequencies in proportion that match what the device was expected to emit. For example, if between the headers, the device emits 56 frequencies during 6 ms, each followed by a silence of 75 ms, and by another 56 frequencies during 6 ms each (for a total of 747 ms), and if there is a real distance between the header of 687 ms, then the partition will be about 56 blocks of 5.5 ms followed by a silence of 71 ms and by another set of 56 blocks of 5.5 ms.

For each block, the algorithm will eliminate the first FFT vector and the few last whose window would cover samples from the next block. In the current example, there are 5 or 6 FFT vectors per block and would kept only the 2nd, 3rd, and potentially 4th vector of the block are kept. Those vectors (say $\vec{v}_1, \vec{v}_2, \vec{v}_3$) would then be correlated with the prototype vectors ($\vec{p}_1, \ldots, \vec{p}_m$) generated from the headers using equation 2:

$$\text{dist}(\vec{p}_k, \vec{v}_l) = \frac{\text{Corr}(\vec{p}_k, \vec{v}_l) + 1}{2} \quad \text{(equation 2)}$$

where $$\text{Corr}(\vec{p}_k, \vec{v}_l) = \frac{\text{Cov}(\vec{p}_k, \vec{v}_l)}{\sqrt{\text{Cov}(\vec{p}_k, \vec{p}_k) \cdot \text{Cov}(\vec{v}_l, \vec{v}_l)}} \quad \text{(equation 3)}$$

All the correlations are then adjust to the range [0, 1] using the affine transform (1+c)/2 (where c is a correlation in the range [−1, 1]). For each possible frequency, the highest correlation value would be kept. Those correlations (one per possible frequency) are then normalized for each block independently to sum up to 1. They are now the probabilities of each frequency for the given block.

De-Convolving the Modulated Data String

It is assume that the data string is generated from a sequence of bits using a mixture of bits to frequencies redundant encoding and a convolving machine (convolving is used here in the sense that it usually has in error correction code). For example, the convolving machine could use the following coding scheme:

| | | Machine State: | | | |
|---|---|---|---|---|---|
| Bit Triplets | Next Machine State | A Frequency Pairs | B Frequency Pairs | C Frequency Pairs | D Frequency Pairs |
| 000 | A | $F_1,F_2$ | $F_2,F_1$ | $F_2,F_2$ | $F_3,F_1$ |
| 001 | | $F_4,F_2$ | $F_2,F_4$ | $F_3,F_2$ | $F_3,F_3$ |
| 010 | B | $F_2,F_3$ | $F_3,F_2$ | $F_1,F_3$ | $F_1,F_1$ |
| 011 | | $F_4,F_3$ | $F_3,F_4$ | $F_3,F_3$ | $F_1,F_4$ |
| 100 | C | $F_1,F_4$ | $F_4,F_1$ | $F_2,F_4$ | $F_2,F_2$ |
| 101 | | $F_3,F_4$ | $F_4,F_3$ | $F_4,F_4$ | $F_2,F_3$ |
| 110 | D | $F_2,F_1$ | $F_1,F_2$ | $F_1,F_1$ | $F_4,F_2$ |
| 111 | | $F_3,F_1$ | $F_1,F_3$ | $F_4,F_1$ | $F_4,F_4$ |

With this machine, the received frequencies must be analyzed in pairs. For each encoding, and for each frequency pairs received, an algorithm can compute the prior probabilities of the pairs and their "a posteriori probabilities". The "a priori probabilities" of a pair of frequencies for a given encoding depend solely on the above table. In this case, if the pair exists under the given encoding, it has an "a priori probability" of ⅛, if not, it has 0. Then, for each received frequency pairs, the "a posteriori probabilities" can be computed under each encoding by multiplying the probability of each frequency of the pairs (computed in the previous section) by the "a priori probability" of the pairs. For example, if the previous section assigned P(F1)=0.5 for the first frequency and P(F4)= 0.25 for the second frequency, then under encoding A, the "a posteriori probability" of the pair (F1,F4) would be given by PA(F1,F4)=P(F1)*P(F4)*1/8=0.5*0.25*0.125=0.015625. It is also assumed that the convolution machine starts in a known state (say A) and terminates in a sequence with 0's to inform on its final state.

In analogy to linguistic, frequencies could be considered as letters, frequency pairs as words, and a data string as a statement. The convolution machine defines which words can follow the current word. Knowing the starting state is like capitalizing the first letter, and sending 0's at the end like having a period at the end of a statement. Convoluted code, like grammar, is best de-convolved using an adapted Viterbi decoding algorithm. In this case, the algorithm works on the posterior probabilities to find the most likely sequence.

De-Interlacing and Error Correction

At this stage of the example, the bits sequence can be de-interlaced. Then, error correction can be applied. Basic error correction usually indicates whether some corrections were made for each byte. Moreover, by re-coding the corrected bytes, the receiver can partially controlled whether the correction made is valid. If not, then clearly a non-correctable error is detected.

Evaluating the Solution

If a non-correctable error is found, the algorithm can assume it missed the headers and can try the next most probable pair of positions (T1, T2) in the heap and repeat the whole process with the new prototypes and the new partition it implies. When no non-correctable errors are detected, the number of bytes corrected is the strongest indicator of how well the data string was recognized. Hence, if some bytes are corrected, the algorithm iterates through other pairs of positions from the heap to find a decoded sequence that would require less error correction. A sequence that does not require any correction is the most likely sequence. Finally, when the score of pairs of positions (T1, T2) becomes negative, it is unlikely that good pairs of position remains, and the algorithm stops to iterate. Good pairs of position usually have a positive score. The sequence with the least number of corrections, that is the most likely, is returned.

Charge Level Verification

It was found that in devices capable of acoustic transmission and where no external oscillator is used, one can use the intrinsic characteristics of some microchips that the internal clock frequency decreases with the supplied voltage, and calculate a reference function of "Frequency vs. Voltage" for a particular type of microchip. That function is generally linear an can be expressed as:

$$F_E = f(V)$$

where $F_E$ is the emitted frequency and V is the voltage supplied by the battery.

During normal operation of the device, the voltage level can be estimated using the reverse function of "Voltage vs. Frequency":

$$f(F_E) = V$$

Hence, during signal processing of the data string, a reference frequency is compared to the frequency template, and this allows the voltage level to be estimated. Charge level can be expressed as a voltage value, a percentage of the charge or using another parameter allowing to verify if the device (10) has reached a minimum threshold value. This way, a new device can be sent in advance to the device holder to replace the old one before the battery power is too low and the device (10) stops functioning in an adequate manner.

For a more efficient process, the reference frequencies emitted by each device can be adjusted to precisely match a certain value before they are sent to the transaction system. Calibrating the devices will then facilitate and improve the accuracy of the detection of a low-battery condition.

What is claimed is:

1. A method for coding a digital data string to represent a sequence of acoustic frequencies to be transmitted as an acoustic signal by a genuine acoustic authentication device, the method comprising:

coding each of a plurality of groups of bits of said data string to represent a respective frequency value set of one or more acoustic frequencies to be transmitted acoustically to represent the respective group of bits, wherein each group of bits comprises a plurality of bits and the number of acoustic frequencies in a frequency value set is less than the number of bits in the respective group of bits that the frequency value set represents, thereby providing for the duration of the acoustic sequence that is required to represent the plurality of groups of bits being less than that which is required in the event of representing the plurality of groups of bits with a number of frequency values equal to the number of bits in the plurality of groups of bits of said data string;

for each of the plurality of groups of bits of said data string, selecting said respective frequency value set according to a predetermined frequency assignation pattern that is generated such that (i) each unique pattern of a group of bits is configured for being assigned to any one of a plurality of unique frequency value sets, and the frequency value set assigned to a given pattern of a group of bits is dependent on at least one frequency value set assigned to a respective at least one preceding group of bits, and (ii) for each of the frequency value sets configured to be assigned to a group of bits, there is a known respective probability of the frequency value set following each at least one preceding frequency value set upon which the selection of a subsequent frequency value set is configured to be dependent; and wherein the known probabilities and any given at least one preceding assigned frequency value set used to select a given subsequently assigned frequency value set are configured to be used to statistically determine the likelihood of any given frequency value set following the any given at least one preceding assigned frequency value set, thereby providing for probabilistic transition coding that is configured for being used for error correction of the acoustic signal.

2. The method according to claim 1, wherein the number of bits in each group of bits equals three and wherein for each group of three bits the number of frequency values to be transmitted to represent the three bits equals two, each of the two frequency values being selected from a set of four distinct frequencies.

3. The method according to claim 1, further comprising applying error coding to the data string prior to said frequency coding.

4. The method according to claim 3, further comprising interlacing the bits of the data string following the error coding and prior to said frequency coding.

5. The method according to claim 1, further comprising providing for adding silences between bytes.

6. The method according to claim 1, further comprising adding at least one frequency template to the data string, wherein the at least one frequency template is configured for being used for extracting the data string from an acoustic signal according to a method that includes correlating the acoustic signal with the frequency template.

7. A device comprising a program stored on at least one non-transitory computer-readable medium, the program when executed by at least one processor being operative in implementing a method for coding a digital data string to represent a sequence of acoustic frequencies to be transmitted as an acoustic signal by a genuine acoustic authentication device, the method comprising:

coding each of a plurality of groups of bits of said data string to represent a respective frequency value set of one or more acoustic frequencies to be transmitted acoustically to represent the respective group of bits, wherein each group of bits comprises a plurality of bits and the number of acoustic frequencies in a frequency value set is less than the number of bits in the respective group of bits that the frequency value set represents, thereby providing for the duration of the acoustic sequence that is required to represent the plurality of groups of bits being less than that which is required in the event of representing the plurality of groups of bits with a number of frequency values equal to the number of bits in the plurality of groups of bits of said data string;

for each of the plurality of groups of bits of said data string, selecting said respective frequency value set according to a predetermined frequency assignation pattern that is generated such that
 (i) each unique pattern of a group of bits is configured for being assigned to any one of a plurality of unique frequency value sets, and the frequency value set assigned to a given pattern of a group of bits is dependent on at least one frequency value set assigned to a respective at least one preceding group of bits, and
 (ii) for each of the frequency value sets configured to be assigned to a group of bits, there is a known respective probability of the frequency value set following each at least one preceding frequency value set upon which the selection of a subsequent frequency value set is configured to be dependent; and wherein the known probabilities and any given at least one preceding assigned frequency value set used to select a given subsequently assigned frequency value set are configured to be used to statistically determine the likelihood of any given frequency value set following the any given at least one preceding assigned frequency value set, thereby providing for probabilistic transition coding that is configured for being used for error correction of the acoustic signal.

8. The device according to claim 7, wherein the device is the genuine acoustic authentication device, and wherein the genuine acoustic authentication device includes an acoustic transducer that is operable for emitting the acoustic signal.

9. The device according to claim 8, wherein the device is a hand-held card.

10. The device according to claim 7, wherein the number of bits in each group of bits equals three and wherein for each group of three bits the number of frequency values to be transmitted to represent the three bits equals two, each of the two frequency values being selected from a set of four distinct frequencies.

11. The device according to claim 7, wherein the method further comprises applying error coding to the data string prior to said frequency coding.

12. The device according to claim 11, wherein the method further comprises interlacing the bits of the data string following the error coding and prior to said frequency coding.

13. The device according to claim 7, wherein the method further comprises providing for adding silences between bytes.

14. The device according to claim 7, wherein the method further comprises adding at least one frequency template to the data string, wherein the at least one frequency template is configured for being used for extracting the data string from an acoustic signal according to a method that includes correlating the acoustic signal with the frequency template.

15. A method for facilitating the extraction of a data string transmitted by a genuine acoustic authentication device as an acoustic signal, the method comprising:

decoding a signal that comprises a sequence of frequency values corresponding to an acoustic signal transmitted by a genuine acoustic authentication device, the signal having been coded according to a method comprising:
 (a) coding each of a plurality of groups of bits of said data string to represent a respective frequency value set of one or more acoustic frequencies to be transmitted acoustically to represent the respective group of bits, wherein each group of bits comprises a plurality of bits and the number of acoustic frequencies in a frequency value set is less than the number of bits in the respective group of bits that the frequency value set represents, thereby providing for the duration of the acoustic sequence that is required to represent the plurality of groups of bits being less than that which is required in the event of representing the plurality of groups of bits with a number of frequency values equal to the number of bits in the plurality of groups of bits of said data string;
 (b) for each of the plurality of groups of bits of said data string, selecting said respective frequency value set according to a predetermined frequency assignation pattern that is generated such that
  (i) each unique pattern of a group of bits is configured for being assigned to any one of a plurality of unique frequency value sets, and the frequency value set assigned to a given pattern of a group of bits is dependent on at least one frequency value set assigned to a respective at least one preceding group of bits, and
  (ii) for each of the frequency value sets configured to be assigned to a group of bits, there is a known respective probability of the frequency value set following each at least one preceding frequency value set upon which the selection of a subsequent frequency value set is configured to be dependent; and
 (c) wherein the known probabilities and any given at least one preceding assigned frequency value set used to select a given subsequently assigned frequency value set are configured to be used to statistically determine the likelihood of any given frequency value set following the any given at least one preceding assigned frequency value set, thereby providing for probabilistic transition coding that is configured for being used for error correction of the acoustic signal.

16. The method according to claim 15, wherein the number of bits in each group of bits equals three and wherein for each group of three bits the number of frequency values to be transmitted to represent the three bits equals two, each of the two frequency values being selected from a set of four distinct frequencies.

17. The method according to claim 15, wherein the method by which the signal has been coded further comprises applying error coding to the data string prior to said frequency coding.

18. The method according to claim 17, wherein the method by which the signal has been coded further comprises interlacing the bits of the data string following the error coding and prior to said frequency coding.

19. The method according to claim 15, wherein the method by which the signal has been coded further comprises providing for adding silences between bytes.

20. The method according to claim 15, wherein the method by which the signal has been coded further comprises adding at least one frequency template to the data string, wherein the at least one frequency template is configured for being used for extracting the data string from an acoustic signal according to a method that includes correlating the acoustic signal with the frequency template.

21. The method according to claim 20, wherein the method for facilitating the extraction of the data signal includes applying a frequency templates mask to locate start and end frequency patterns of the data string received as an acoustic signal transmitted by the genuine acoustic authentication device.

22. The method according to claim 15, further comprising estimating a charge level of the genuine acoustic authentication device based, at least in part, on comparing at least one of the frequency values corresponding to the acoustic signal transmitted by the genuine acoustic authentication device with a reference frequency.

23. The method according to claim 22, further comprising: comparing the charge level to a minimal threshold; and upon determining that the charge level is below the minimal threshold, notifying a user of the genuine acoustic authentication device.

24. The method according to claim 23, wherein said notifying the user comprises sending another genuine acoustic authentication device to the user.

25. A device comprising a program stored on at least one non-transitory computer-readable medium, the program when executed by at least one processor being operative in implementing a method for facilitating the extraction of a data string transmitted as an acoustic signal by a genuine acoustic authentication device, the method comprising:

decoding a signal that comprises a sequence of frequency values corresponding to an acoustic signal transmitted by a genuine acoustic authentication device, the signal having been coded according to a method comprising:

(a) coding each of a plurality of groups of bits of said data string to represent a respective frequency value set of one or more acoustic frequencies to be transmitted acoustically to represent the respective group of bits, wherein each group of bits comprises a plurality of bits and the number of acoustic frequencies in a frequency value set is less than the number of bits in the respective group of bits that the frequency value set represents, thereby providing for the duration of the acoustic sequence that is required to represent the plurality of groups of bits being less than that which is required in the event of representing the plurality of groups of bits with a number of frequency values equal to the number of bits in the plurality of groups of bits of said data string;

(b) for each of the plurality of groups of bits of said data string, selecting said respective frequency value set according to a predetermined frequency assignment pattern that is generated such that (i) each unique pattern of a group of bits is configured for being assigned to any one of a plurality of unique frequency value sets, and the frequency value set assigned to a given pattern of a group of bits is dependent on at least one frequency value set assigned to a respective at least one preceding group of bits, and (ii) for each of the frequency value sets configured to be assigned to a group of bits, there is a known respective probability of the frequency value set following each at least one preceding frequency value set upon which the selection of a subsequent frequency value set is configured to be dependent; and (c) wherein the known probabilities and any given at least one preceding assigned frequency value set used to select a given subsequently assigned frequency value set are configured to be used to statistically determine the likelihood of any given frequency value set following the any given at least one preceding assigned frequency value set, thereby providing for probabilistic transition coding that is configured for being used for error correction of the acoustic signal.

26. The device according to claim 25, wherein the device is a transaction system that is operable to receive the acoustic signal transmitted by the genuine acoustic authentication device.

27. The device according to claim 25, wherein the number of bits in each group of bits equals three and wherein for each group of three bits the number of frequency values to be transmitted to represent the three bits equals two, each of the two frequency values being selected from a set of four distinct frequencies.

28. The device according to claim 25, wherein the method by which the signal has been coded further comprises applying error coding to the data string prior to said frequency coding.

29. The device according to claim 28, wherein the method by which the signal has been coded further comprises interlacing the bits of the data string following the error coding and prior to said frequency coding.

30. The device according to claim 25, wherein the method by which the signal has been coded further comprises providing for adding silences between bytes.

31. The device according to claim 25, wherein the method by which the signal has been coded further comprises adding at least one frequency template to the data string, wherein the at least one frequency template is configured for being used for extracting the data string from an acoustic signal according to a method that includes correlating the acoustic signal with the frequency template.

32. The method according to claim 31, wherein the method for facilitating the extraction of the data signal includes applying a frequency templates mask to locate start and end frequency patterns of the data string received as an acoustic signal transmitted by the genuine acoustic authentication device.

33. The device according to claim 25, wherein the method for facilitating the extraction of the data string further comprises estimating a charge level of the genuine acoustic authentication device based, at least in part, on comparing at least one of the frequency values corresponding to the acoustic signal transmitted by the genuine acoustic authentication device with a reference frequency.

34. The device according to claim 33, further comprising: comparing the charge level to a minimal threshold; and upon determining that the charge level is below the minimal threshold, notifying a user of the genuine acoustic authentication device.

35. The device according to claim 34, wherein said notifying the user comprises sending another genuine acoustic authentication device to the user.

* * * * *